May 3, 1927.
W. L. HANLEY, JR
1,626,675
CLAY TEMPERING AND EXPRESSING APPARATUS
Filed Feb. 26, 1924
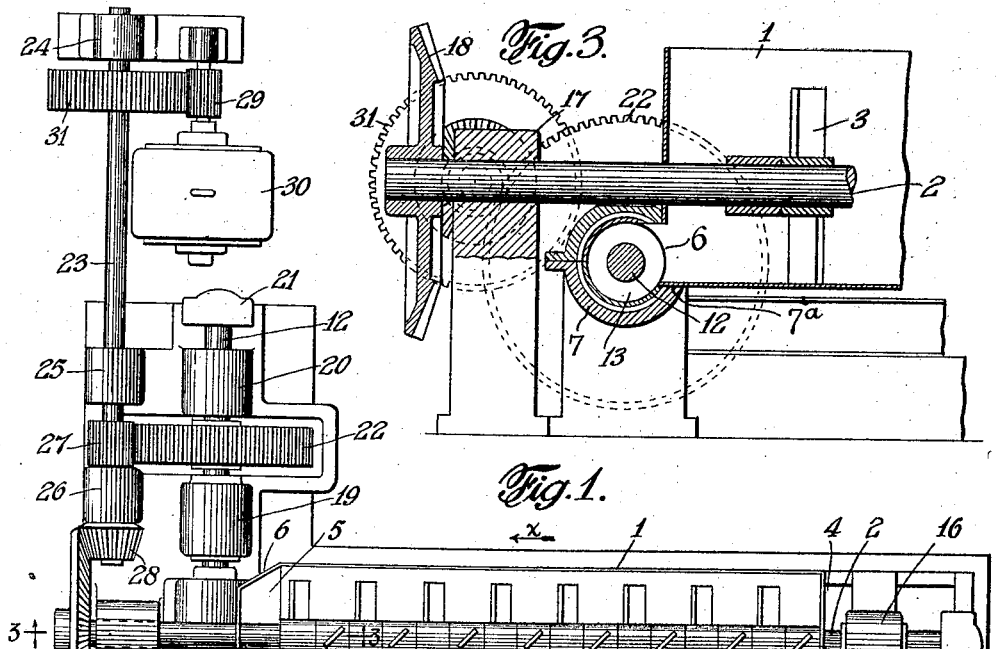
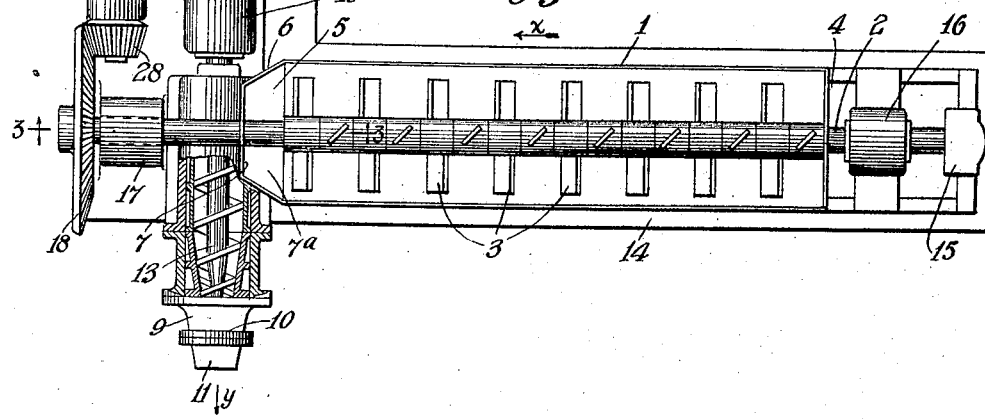
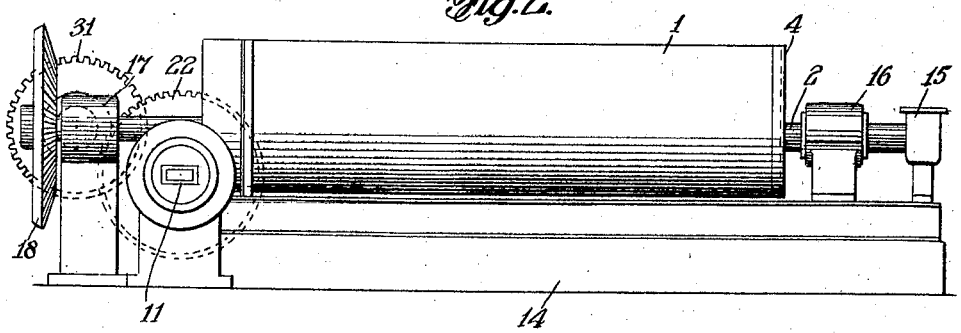
INVENTOR
William L. Hanley Jr.
BY
Louis Prevost Whitaker ATTORNEY Patented May 3, 1927.

1,626,675

UNITED STATES PATENT OFFICE.

WILLIAM LEE HANLEY, JR., OF BRADFORD, PENNSYLVANIA.

CLAY TEMPERING AND EXPRESSING APPARATUS.

Application filed February 26, 1924. Serial No. 695,223.

My invention consists in the novel features hereinafter described, reference being had to the accompanying drawings which illustrate one embodiment of the same selected by me for purposes of illustration, and the said invention is fully disclosed in the following description and claims.

In the construction of machines for tempering and expressing clay in the production of brick, tile, and other clay products, it is necessary to have the cylinder of the tempering mechanism disposed horizontally and of considerable length, in order that the clay and water may be properly and thoroughly mixed and the clay brought to the proper state of plasticity in passing from the inlet end of the tempering cylinder to its outlet end. It is also extremely desirable to combine with the tempering mechanism a clay expressing mechanism or "auger" in order to simplify the transfer of the clay from the tempering mechanism and to deliver it directly into the cylinder of the expressing mechanism. Where these machines have been combined it is customary to employ in connection with a horizontally disposed tempering mechanism, or pug mill, an expressing mechanism located adjacent to the delivery end of the tempering mechanism and extending in the same direction, and either forming a continuation of the pug mill in direct alignment therewith, or being located at one side of the delivery end of the expressing mechanism, while the driving mechanism for both the tempering mechanism and expressing mechanism is located adjacent to the inlet end of the tempering mechanism. This necessitates the location of the auger or expressing device at the extreme end of a long shaft extending the length of the expressing mechanism, either within the same or without the same, as the case may be. Under exceedingly great pressure exerted by the auger, it is extremely objectionable to have it located so far from its driving mechanism on account of the severe torsional strain to which the long driving shaft is necessarily subjected, and further in the ordinary construction the discharge end of the expressing mechanism, which is usually provided with a suitable die or dies for the purpose of imparting the desired form to the stream of clay issuing therefrom, is located beyond and at a distance from the tempering mechanism, so that separate operatives are necessary in order to secure the proper and continuous operation of the tempering and expressing mechanisms. My invention has for its object a novel construction in which the tempering mechanism and expressing mechanism are arranged horizontally and substantially in the same horizontal plane, but extend at right angles to each other, the tempering mechanism discharging at its delivery end directly into the expressing mechanism, and the expressing mechanism having its discharge end located at one side of, but closely adjacent to the delivery end of the tempering mechanism, and the provision of driving mechanism located adjacent to the delivery end of the tempering mechanism and the inlet end of the expressing mechanism, whereby the auger of the expressing mechanism is provided with a comparatively short shaft and the gear therefor, as well as the thrust bearing therefor, are brought in relatively close proximity to the expressing mechanism, the driving mechanism for both the tempering and expressing mechanisms being preferably actuated from a common driving shaft extending between the driving gears, for driving the shafts of the tempering mechanism and expressing mechanism, so that a well balanced driving mechanism is provided for both mechanisms, and a smooth and uniform operation thereof is insured. By this arrangement it is also possible to oversee the operation of both the tempering and expressing mechanisms from a position alongside of the tempering mechanism so that it is ordinarily unnecessary to employ more than a single operative for this purpose.

Referring to the drawings,

Fig. 1 represents a plan view, partly in section of a combined clay tempering and expressing mechanism embodying my invention and selected by me for the purpose of illustrating the same.

Fig. 2 represents a side elevation of the machine shown in Fig. 1.

Fig. 3 represents an enlarged partial section on line 3—3 of Fig. 1.

Referring to the embodiment of my invention illustrated in these drawings, 1, represents a cylinder or casing of the tempering mechanism, or pug mill as it is frequently called, which is disposed horizontally and may be open at the top or partially or wholly closed, as may be desired. The cylinder, 1, is provided with one or more shafts extending therethrough, a single shaft, 2, being shown herein carrying tempering blades, 3, for mixing the clay with water and bringing it to the proper condition of plasticity. The tempering cylinder is also provided with suitable means for moving the clay from the inlet end, indicated at 4, to the outlet end, indicated at 5, which may be accomplished by setting the tempering blades, 3, angularly with respect to the shaft, as indicated in Fig. 1, so that said blades will perform the function of feeding the clay endwise toward the discharge end of the cylinder, or any other different or additional means may be employed for effecting the longitudinal feed of the clay through the tempering cylinder adjacent to its discharge end. The tempering cylinder is preferably provided with a narrow throat portion, indicated at 6, which communicates through an aperture, indicated at 7ª, directly with the side of the cylinder, 7, of the expressing mechanism, which is disposed horizontally and located transversely of and adjacent to the discharge end of the tempering cylinder. As best illustrated in Fig. 3, the discharge throat, 6, has its lower edge coincident with the bottom of the casing, 1, of the tempering mechanism, and opens directly into the aperture, 7ª, in the side of the expressing cylinder, 7, the bottom of which cylinder is preferably slightly lower than the bottom of the casing, 1, thus insuring a free and uninterrupted discharge of the tempered clay from the tempering mechanism to the expressing mechanism, and the casing, 1, will be of sufficient length, and the feed of the tempering blades is such that clay and water delivered to the receiving end of the tempering mechanism will arrive at the discharge aperture, 7ª, at the proper state of plasticity to be delivered to the expressing mechanism. This provides a continuous and uniform supply to the expressing device at all times when the machine is in operation. The outlet end of the expressing cylinder is preferably provided with tapering portions, indicated at 9, leading to a discharge outlet, 10, which communicates with a suitable die, indicated at 11, for giving the expressed stream of clay the desired form, as for a brick, pipe or hollow tile, as the case may be, it being understood that the stream of clay will be suitably severed into individual bricks, pipes or tiles by means of cutting mechanism (not shown) in any usual or desired manner. The expressing cylinder is located in substantially the same horizontal plane as the tempering cylinder, and is provided with a longitudinal shaft, 12, extending therefrom and provided within the same with an expressing screw, or auger, indicated at 13, for feeding and expressing the tempered clay from the cylinder in the direction of the arrow, y, in Fig. 1. As a matter of fact, the axis of the expressing cylinder is located slightly lower than the axis of the tempering cylinder to permit the shaft 2 of the latter to pass over the top of the expressing cylinder, as clearly illustrated in Figs. 2 and 3. It will also be noted that the discharge aperture of the expressing cylinder and the die or dies connected therewith, are located substantially alongside of and closely adjacent to the tempering cylinder.

The tempering and expressing cylinders are preferably mounted on a suitable base, indicated at 14, which also supports the main portions of the driving mechanism. The shaft, 2, of the tempering mechanism is provided adjacent to its outer or inlet end with a thrust bearing, 15, and supporting bearing, 16, and said shaft is also provided beyond the discharge end of the tempering cylinder, with a supporting bearing, 17, which is preferably secured to and supported by the expressing cylinder, 7, and is provided beyond said bearing with a beveled driving gear, 18. The shaft, 12, of the expressing mechanism is provided adjacent to its inlet end with supporting bearings, 19 and 20, and a thrust bearing, 21, to receive the severe end thrust of said shaft, said shaft being also provided between the bearings, 20 and 19, with a large gear wheel, 22. The portion of the shaft, 12, outside of the expressing cylinder, is substantially enclosed and supported by the bearings, 19 and 20, and the driving wheel, 22, is brought as close to the inlet end of the expressing cylinder as the bearing, 19, will permit, so that the torsional strain on the shaft, 12, is reduced to a minimum, and it is securely held against lateral vibration.

I prefer to drive both mechanisms by means of a main driving shaft, indicated at 23, usually mounted in suitable bearings, indicated at 24, 25 and 26, and is provided with a foundation, 27, meshing with the gear, 22, on shaft, 12, of the expressing mechanism, and with a beveled pinion, 28, meshing with the beveled gear, 18, the said gear wheels, 22 and 18, being located on opposite sides of the driving shaft, thus tending to equalize the driving strain on the driving shaft, 23, and provide a well balanced driving mechanism.

The driving shaft may be operated from any suitable source of power by means of cog, belt and pulley or chain and sprocket gearing. I prefer to operate the driving shaft by means of an electric motor, indicated at 30, the shaft of which is provided with a pinion, 29, meshing with a gear wheel, 31, on the driving shaft, 23, as shown in Fig. 1. The driving shaft may be operated in any other desired manner or from any other suitable source of power, as may be desired.

The operation of my improved appartus is as follows: The necessary rotary movements are imparted to the shaft, 2, of the tempering mechanism, and the shaft, 12, of the expressing mechanism, at the relative speeds determined by the ratio of the pinions, 27 and 28, and gear wheels, 22 and 18, the shaft, 2, being rotated in such direction as to produce a feeding movement toward the discharge end therein, in the direction of the arrow, $x$, Fig. 1, and the shaft, 12, being rotated in such direction as to produce a feeding movement, by means of its screw or auger, 13, in the direction of the arrow, $y$, in Fig. 1. Clay and a certain amount of water is fed to the tempering cylinder, 1, adjacent to its inlet end, 4, and the clay and water are mixed into a composite mass by the tempering blades toward the discharge end of the cylinder and gradually tempered or brought into the desired condition of plasticity. At the discharge end of the tempering cylinder the tempered clay is continuously fed directly into the cylinder, 7, of the expressing mechanism, where it comes in contact with and is continuously fed toward the delivery end of the expressing cylinder, and is forced out in a continuous stream through the die or dies, 11, in the form desired for brick, pipe or hollow tile, etc., thereafter to be borne off by a suitable bearing off belt (not shown) and severed into individual bricks, pipes or tile, in any usual or preferred manner.

It will be noted that the apparatus is very compact, the two cylinders being located closely adjacent to each other, and the tempering cylinder discharging preferably as shown directly into the side of the expressing cylinder, so that the clay is delivered from one cylinder to the other without the necessity of interposing additional transferring mechanism. Both cylinders are disposed horizontally and in substantially the same horizontal plane, it being only necessary to offset one cylinder sufficiently to permit the shaft of the other to pass it, and I prefer to offset the expressing cylinder as herein shown, and to place it with its axis very slightly below the axis of the tempering cylinder, so as to permit the shaft of the latter to pass over the expressing cylinder. This arrangement also facilitates the delivery of the tempered clay from the tempering cylinder to the expressing cylinder, as such delivery is facilitated rather than retarded by gravity. It will also be noted that the stream of clay issues from the die, 11, at a point closely adjacent to the discharge end of the tempering cylinder so that a single operative can readily oversee the operation of the tempering and expressing mechanisms from a point between the said die and the adjacent side of the tempering cylinder. It will also be noted that the driving mechanism for both the tempering mechanism and expressing mechanism is brought very close to the inlet end of the expressing mechanism, so that a very short shaft for the screw or auger can be employed and the exterior portions of said shaft outside of the cylinder of the expressing mechanism are practically completely enclosed and supported by bearings and the driving gear wheel therefor is brought as closely as possible to the inner end of the expressing cylinder, thereby greatly reducing the torsional strains on said shaft and obviating lateral vibration thereof.

It will also be noted that the main driving shaft is located between the gears on the driving shafts for the tempering mechanism and expressing mechanism respectively, thus providing a well balanced driving mechanism, and reducing the torsional strain and vibration of the driving shaft. The construction herein disclosed is extremely simple, convenient and efficient, and the objections heretofore noted as incidental to the prior forms of apparatus for this purpose, are entirely obviated.

What I claim and desire to secure by Letters Patent is:—

1. In a machine of the character described, the combination of a horizontally disposed clay tempering cylinder, and a horizontally disposed expressing cylinder located adjacent to the discharge end of the tempering cylinder and substantially perpendicularly thereto, rotary tempering and feeding devices located in said tempering cylinder, and constructed to effect a feed of the material from the delivery end of the tempering cylinder to the discharge end thereof, said tempering cylinder being of such length as to reduce clay and water admitted to its outer end to proper plastic condition during its travel to the discharge end thereof, said tempering cylinder having a discharge aperture, the lower edge of which is substantially coincident with the bottom of said cylinder, communicating directly with a corresponding aperture in the side of the expressing cylinder, and located slightly above the bottom of the expressing cylinder, an expressing auger located in the expressing cylinder, and common driving means for said auger and for the clay tempering devices located closely adjacent to the intersection of said cylinders.

2. In a machine of the character described, the combination of a tempering cylinder of sufficient length to receive clay and water at its inlet end and reduce it to proper plastic condition during its passage longitudinally therethrough, said cylinder having a discharge aperture at its discharge end, the lower edge of said aperture being substantially coincident with the bottom of said cylinder, a tempering shaft extending longitudinally through said cylinder and provided with exterior bearings, an expressing cylinder located transversely of the tempering cylinder adjacent to the discharge end thereof, and communicating therewith by an aperture in the side of said expressing cylinder registering with the discharge aperture of the tempering cylinder, the expressing cylinder being located below the tempering shaft, an expressing auger in the expressing cylinder, provided with a longitudinal shaft extending outside of the expressing cylinder adjacent to the inlet end thereof, and provided closely adjacent to said inlet end with exterior bearings and a driving wheel, a driving shaft arranged parallel to the auger shaft and geared with said driving wheel thereof, a driving wheel on the tempering shaft, and gearing connecting said wheel with said driving shaft.

3. In a machine of the character described, the combination of a horizontally disposed tempering cylinder provided with a longitudinal tempering shaft extending therethrough, and provided with rotary tempering devices constructed to effect a feed of material from the inlet end to the discharge end of the said cylinder, exterior supporting bearings for said shaft, a thrust bearing for said shaft located adjacent to the inlet end of said cylinder, said cylinder being provided with a discharge aperture at its delivery end having its lower edge substantially coincident with the bottom of the cylinder, a horizontal expressing cylinder located adjacent to the discharge end of the tempering cylinder and disposed perpendicularly thereto, said expressing cylinder being located below the tempering shaft and provided with a lateral inlet aperture communicating directly with the discharge aperture of the tempering cylinder, an auger shaft extending through the expressing cylinder, an auger on said shaft within said cylinder, exterior bearings for said auger shaft, and a thrust bearing therefor located closely adjacent to the inlet end of the expressing cylinder, a common driving shaft disposed parallel to the auger shaft, and gearing connecting said driving shaft with the auger shaft and with said tempering shaft.

In testimony whereof I affix my signature.

WILLIAM LEE HANLEY, Jr.